United States Patent
Debnath et al.

(10) Patent No.: US 12,524,347 B2
(45) Date of Patent: Jan. 13, 2026

(54) REDUCING DC POWER CONSUMPTION USING DYNAMIC MEMORY PREFETCHING FOR PROCESSING ENGINES

(71) Applicant: QUALCOMM Incorporated, San Diego, CA (US)

(72) Inventors: Monobrata Debnath, San Diego, CA (US); Rohit Thulasiram, San Diego, CA (US); Ananya Patel, San Diego, CA (US); Srinivas Ramana, San Diego, CA (US); Azzedine Adam Touzni, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/428,379

(22) Filed: Jan. 31, 2024

(65) Prior Publication Data

US 2025/0245159 A1    Jul. 31, 2025

(51) Int. Cl.
*G06F 12/0862*     (2016.01)
*G06F 12/0811*     (2016.01)

(52) U.S. Cl.
CPC ...... *G06F 12/0862* (2013.01); *G06F 12/0811* (2013.01)

(58) Field of Classification Search
CPC .......................... G06F 12/0862; G06F 12/0811
See application file for complete search history.

(56) References Cited

U.S. PATENT DOCUMENTS

| | | | |
|---|---|---|---|
| 11,816,103 B1* | 11/2023 | Goel | G06F 16/24552 |
| 2003/0140245 A1* | 7/2003 | Dahan | G06F 21/556 726/34 |
| 2012/0072667 A1* | 3/2012 | Anderson | G06F 12/0897 711/E12.024 |
| 2018/0068134 A1* | 3/2018 | Schwarz | G06F 21/74 |
| 2018/0165204 A1* | 6/2018 | Venkatesh | G06F 12/084 |
| 2019/0101973 A1* | 4/2019 | Ashkar | G06F 1/324 |
| 2021/0011726 A1* | 1/2021 | Alam | G06F 9/30047 |
| 2021/0034539 A1* | 2/2021 | Roberts | G06F 12/0897 |
| 2023/0195634 A1* | 6/2023 | Ganapathy | G06F 13/161 711/145 |
| 2024/0193088 A1* | 6/2024 | Sun | G06F 12/0862 |
| 2024/0311171 A1* | 9/2024 | Van Schaik | G06F 21/53 |
| 2024/0354110 A1* | 10/2024 | Alcorta Lozano | G06F 12/0862 |
| 2025/0190225 A1* | 6/2025 | Debnath | G06F 1/3243 |

\* cited by examiner

*Primary Examiner* — Scott T Baderman
(74) *Attorney, Agent, or Firm* — Loza & Loza LLP

(57) ABSTRACT

Aspects of the disclosure are directed to dynamic memory prefetching. In accordance with one aspect, the disclosure includes a main memory configured to store data; a memory hierarchy coupled to the main memory, the memory hierarchy configured to augment the main memory; and a trusted zone element coupled to the memory hierarchy, the trusted zone element configured to read a shared memory to determine a specific control register and one or more prefetch values based on a secure monitor call (SMC). In another aspect, the disclosure includes reading a shared memory to determine a specific control register and one or more prefetch values based on a secure monitor call (SMC); and writing the one or more prefetch values to an exception level register.

12 Claims, 4 Drawing Sheets

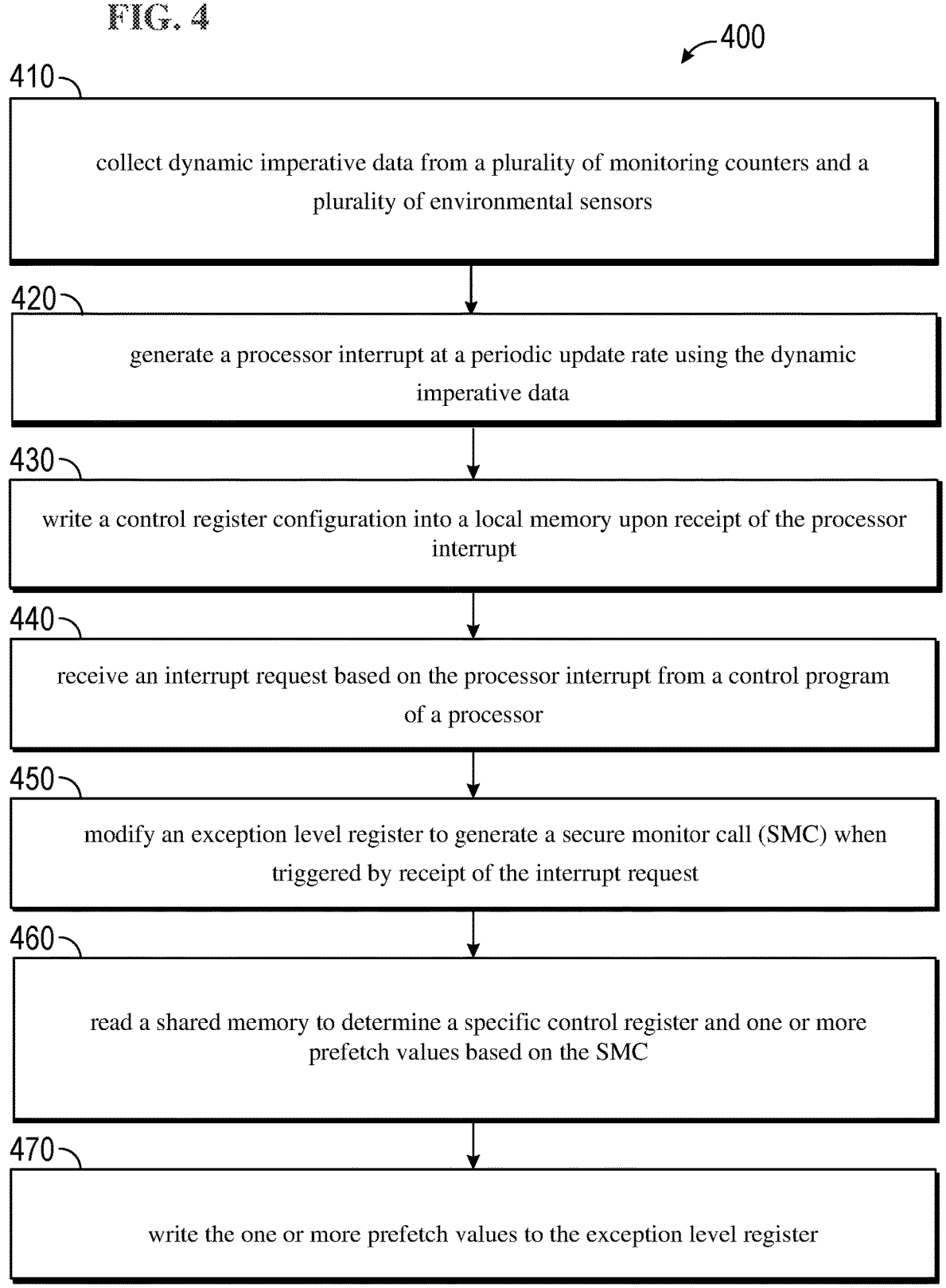

REDUCING DC POWER CONSUMPTION USING DYNAMIC MEMORY PREFETCHING FOR PROCESSING ENGINES

TECHNICAL FIELD

This disclosure relates generally to the field of computer processor architecture, and, in particular, to dynamic memory prefetching for processing engines.

BACKGROUND

An information processing system, for example, a computing platform, strives for a balance between processing throughput and dc power consumption. One approach for improving processing throughput attempts to minimize processing latency (i.e., delay in fetching and executing processing operations). Hence, for certain processors, such as a central processing unit (CPU), processor performance may be improved by data and instruction prefetching from main memory to cache memory prior to execution time. However, in certain scenarios, prefetching may instead degrade processor performance and incur higher dc power consumption. An efficient prefetching approach is desired to improve overall processor performance.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides dynamic prefetching. Accordingly, an apparatus including: a main memory configured to store data; a memory hierarchy coupled to the main memory, the memory hierarchy configured to augment the main memory; and a trusted zone element coupled to the memory hierarchy, the trusted zone element configured to read a shared memory to determine a specific control register and one or more prefetch values based on a secure monitor call (SMC).

In one example, the one or more prefetch values determines an enablement or a disablement of a cache prefetch. In one example, the enablement or the disablement is based on a comparison of a clock frequency of a processor and a settable threshold frequency. In one example, the apparatus further include an exception level register coupled to the memory hierarchy, the exception level register configured to hold the one or more prefetch values.

In one example, the apparatus further include a system initialization module coupled to the memory hierarchy, the system initialization module configured to write the one or more prefetch values to the exception level register. In one example, the apparatus further include a control program coupled to the memory hierarchy, the control program configured to collect a dynamic imperative data from a plurality of monitoring counters and a plurality of environmental sensors. In one example, the control program is further configured to generate a processor interrupt at a periodic update rate using the dynamic imperative data. In one example, the control program is further configured to write a control register configuration into a local memory upon receipt of the processor interrupt. In one example, the trusted zone element is further configured to receive an interrupt request based on the processor interrupt from the control program.

In one example, the trusted zone element is further configured to modify the exception level register to generate the secure monitor call (SMC) when triggered by receipt of the interrupt request. In one example, the memory hierarchy includes a level 1 (L1) cache memory, a level 2 (L2) cache memory and a level 3 (L3) cache memory.

Another aspect of the disclosure provides a method including: reading a shared memory to determine a specific control register and one or more prefetch values based on a secure monitor call (SMC); and writing the one or more prefetch values to an exception level register.

In one example, the one or more prefetch values determines an enablement or a disablement of a cache prefetch. In one example, the method further include enabling the cache prefetch if a clock frequency of a processor is greater than a settable threshold frequency.

In one example, the method further include disabling the cache prefetch if a clock frequency of a processor is less than or equal to a settable threshold frequency. In one example, the method further include executing the cache prefetch on a cache memory or on a memory management unit (MMU). In one example, the cache memory is one of: an L1 cache memory, an L2 cache memory, or an L3 cache memory.

In one example, the method further include modifying the exception level register to generate the secure monitor call (SMC) when triggered by receipt of an interrupt request. In one example, the method further include receiving the interrupt request based on a processor interrupt from a control program of a processor. In one example, the method further include writing a control register configuration into a local memory upon receipt of the processor interrupt. In one example, the control register configuration includes a settable threshold frequency.

In one example, the method further include generating the processor interrupt at a periodic update rate using a dynamic imperative data. In one example, the method further include collecting the dynamic imperative data from a plurality of monitoring counters and a plurality of environmental sensors. In one example, the dynamic imperative data is a clock frequency of the processor.

Another aspect of the disclosure provides an apparatus including: means for reading a shared memory to determine a specific control register and one or more prefetch values based on a secure monitor call (SMC); and means for writing the one or more prefetch values to an exception level register.

In one example, the apparatus further include: means for enabling a cache prefetch if a clock frequency of a processor is greater than a settable threshold frequency; and means for disabling the cache prefetch if the clock frequency of the processor is less than or equal to the settable threshold frequency and, wherein the one or more prefetch values determines an enablement or a disablement of the cache prefetch.

In one example, the apparatus further include: means for modifying the exception level register to generate the secure monitor call (SMC) when triggered by receipt of an interrupt request; means for receiving the interrupt request based on a processor interrupt from a control program of a processor; means for writing a control register configuration into a local memory upon receipt of the processor interrupt; means for generating the processor interrupt at a periodic update rate using a dynamic imperative data; and means for collecting the dynamic imperative data from a plurality of monitoring counters and a plurality of environmental sensors.

Another aspect of the disclosure provides a non-transitory computer-readable medium storing computer executable code, operable on a device including at least one processor and at least one memory coupled to the at least one processor, wherein the at least one processor is configured to implement dynamic memory prefetching, the computer executable code including: instructions for causing a computer to read a shared memory to determine a specific control register and one or more prefetch values based on a secure monitor call (SMC); and instructions for causing the computer to write the one or more prefetch values to an exception level register.

In one example, the non-transitory computer-readable medium further includes: instructions for causing the computer to enable a cache prefetch if a clock frequency of a processor is greater than a settable threshold frequency; and instructions for causing the computer to disable the cache prefetch if the clock frequency of the processor is less than or equal to the settable threshold frequency, and wherein the one or more prefetch values determines an enablement or a disablement of the cache prefetch.

In one example, the non-transitory computer-readable medium further includes: instructions for causing the computer to modify the exception level register to generate the secure monitor call (SMC) when triggered by receipt of an interrupt request; instructions for causing the computer to receive the interrupt request based on a processor interrupt from a control program of a processor; instructions for causing the computer to write a control register configuration into a local memory upon receipt of the processor interrupt; instructions for causing the computer to generate the processor interrupt at a periodic update rate using a dynamic imperative data; and instructions for causing the computer to collect the dynamic imperative data from a plurality of monitoring counters and a plurality of environmental sensors.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 4 illustrates an example of a dynamic prefetching flow diagram.

DETAILED DESCRIPTION

Figure 1:
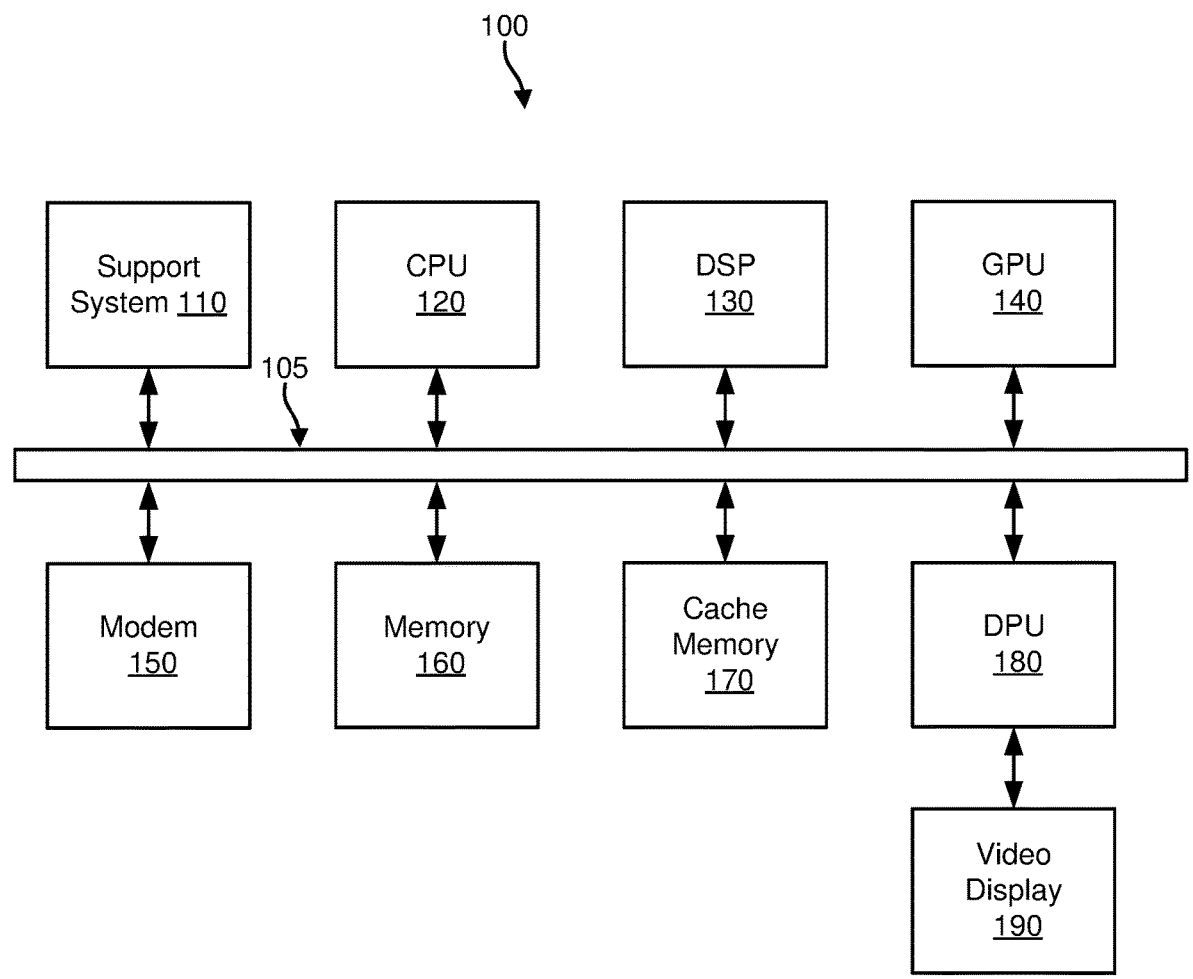
FIG. 1 illustrates an example information processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one example, processing operations in an information processing system require retrieval of data and instructions from a memory for execution. For example, data and instructions may be stored within a memory hierarchy which includes different memory types with different performance attributes. For example, one memory type may have very fast access time (e.g., minimal latency) but limited storage capacity, and another memory type may have slower access time (e.g., longer latency) but very large storage capacity. In one example, the memory hierarchy is designed to balance overall latency, storage capacity and cost. One type of memory which has very fast access time is a cache memory. For example, a cache memory may have a specialized interface with a processor to minimize data and instruction retrieval latency. For example, a main memory may have a larger storage capacity but a slower access time compared to the cache memory.

In one example, the memory hierarchy may include a plurality of cache memories which augments the main memory. For example, the plurality of cache memories may include a level 1 cache memory (e.g., L1 cache memory), a level 2 cache memory (e.g., L2 cache memory), and a level 3 cache memory (e.g., L3 cache memory). In one example, the L1 cache memory has the fastest access time and the smallest storage capacity of the plurality of cache memories. In one example, the L2 cache memory has the second fastest access time and the second smallest storage capacity of the plurality of cache memories. In one example, the L3 cache memory has the slowest access time and the largest storage capacity of the plurality of cache memories.

In one example, prior to execution of an instruction, data and instructions may be retrieved from the main memory and placed into the plurality of cache memories ahead of the time needed for execution. In one example, this retrieval is an example of prefetching; that is, retrieving information from main memory earlier than required for execution (i.e., ahead of demand access).

In one example, the information processing system may need to access data which is stored somewhere in the memory hierarchy. In one example, for fastest access, a memory read (i.e., a directive to retrieve requested data from memory) may be attempted first with a cache memory. For example, if the requested data is actually stored in the cache memory, this action is known as a cache memory hit or a memory hit (i.e., a hit). For example, if the requested data is not stored in the cache memory, this action is known as a cache memory miss or a memory miss (i.e., a miss) and the requested data must be retrieved from the main memory.

FIG. 1 illustrates an example information processing system 100. In one example, the information processing system 100 includes a plurality of processing engines, or processor cores, such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information. For example, the memory 160 and/or the cache memory 170 may be shared among the CPU 120, the GPU 140 and the other processing engines. In one example, the CPU 120 may include a first internal memory which is not shared with the other processing engines. In one example, the GPU 140 may include a second internal memory which is not shared with the other processing engines. In one example, any processing engine of the plurality of processing engines may have an internal memory (i.e., a dedicated memory) which is not shared with the other processing engines.

In one example, high average memory latency may result in degraded performance. In one example, performance may be enhanced by applying prefetching for certain processors, such as the CPU 120 and the GPU 140 in the example information processing system 100.

Figure 2:
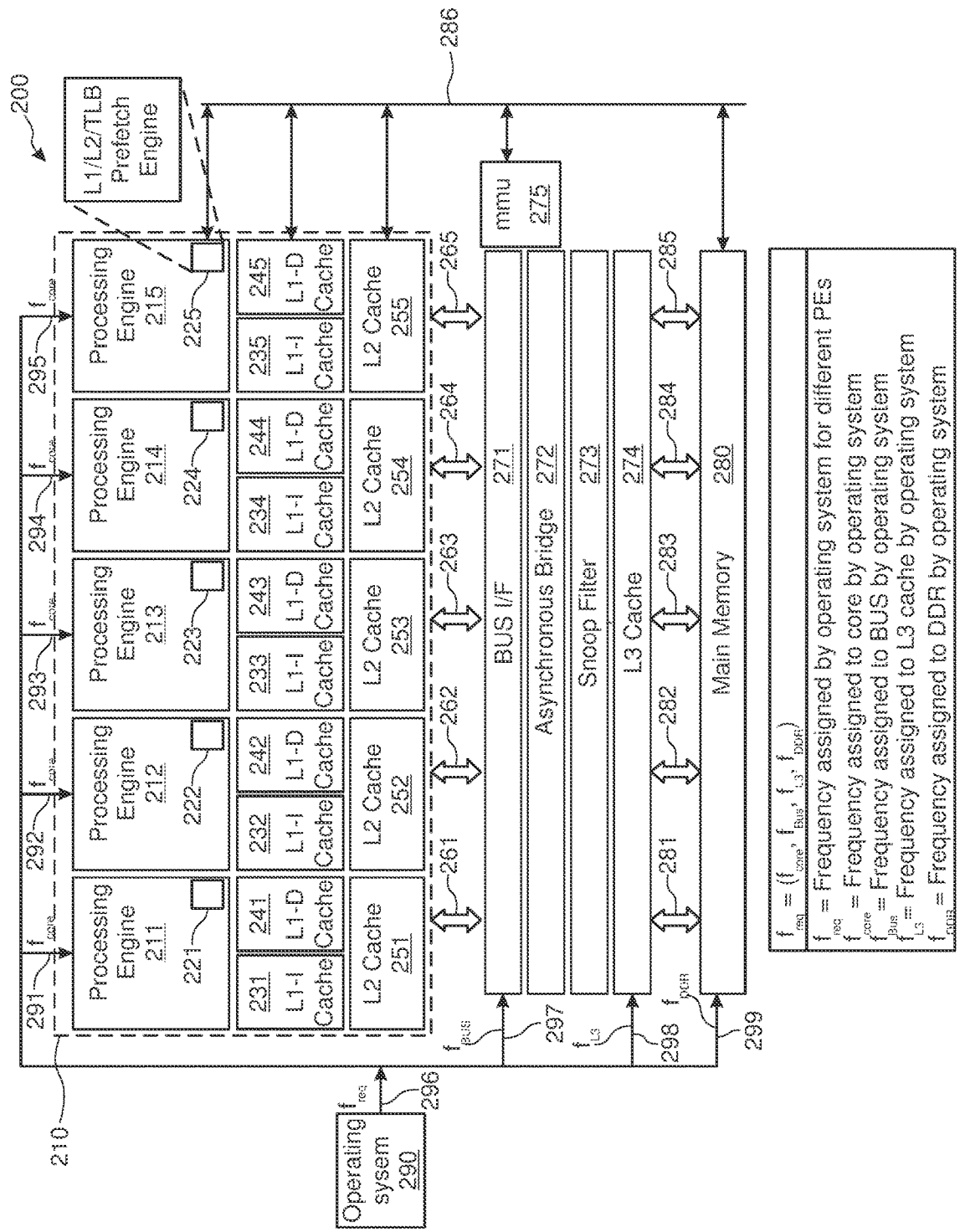
FIG. 2 illustrates an example processor/memory architecture.

FIG. 2 illustrates an example processor/memory architecture 200. In one example, the example processor/memory architecture includes a processing subsystem 210 with a plurality of processing engines and a plurality of cache memories. In one example, the processing subsystem includes a first processing engine 211 with a first prefetch engine 221, a second processing engine 212 with a second prefetch engine 222, a third processing engine 213 with a third prefetch engine 223, a fourth processing engine 214 with a fourth prefetch engine 224, and a fifth processing engine 215 with a fifth prefetch engine 225. In one example, the first processing engine 211, the second processing engine 212, the third processing engine 213, the fourth processing engine 214 and the fifth processing engine 215 perform processing tasks coordinated by an operating system 290.

In one example, the first processing engine 211 is coupled to a first level 1 (L1) instruction cache memory L1-I 231 and a first L1-D data cache memory 241. In one example, the second processing engine 212 is coupled to a second L1 instruction cache memory L1-I 232 and a second L1-D data cache memory 242. In one example, the third processing engine 213 is coupled to a third L1 instruction cache memory L1-I 233 and a third L1-D data cache memory 243. In one example, the fourth processing engine 214 is coupled to a fourth L1 instruction cache memory L1-I 234 and a fourth L1-D data cache memory 244. In one example, the fifth processing engine 215 is coupled to a fifth L1 instruction cache memory L1-I 235 and a fifth L1-D data cache memory 245. In one example, an L1-I instruction cache memory holds instructions and an L1-D data cache memory holds data.

In one example, the first processing engine 211 is coupled to a first level 2 (L2) cache memory 251. In one example, the second processing engine 212 is coupled to a second L2 cache memory 252. In one example, the third processing engine 213 is coupled to a third L2 cache memory 253. In one example, the fourth processing engine 214 is coupled to a fourth L2 cache memory 254. In one example, the fifth processing engine 215 is coupled to a fifth L2 cache memory 255.

In one example, an L1 cache memory has a shorter memory access time (i.e., smaller latency) and a smaller memory capacity than an L2 cache memory. In one example, the L1 cache memory and the L2 cache memory are part of a memory hierarchy.

In one example, the first prefetch engine 221, the second prefetch engine 222, the third prefetch engine 223, the fourth prefetch engine 224 and the fifth prefetch engine 225 execute main memory prefetches for an L1 cache memory, an L2 cache memory and a translation lookaside buffer (TLB). In one example, main memory prefetch means that a plurality of memory words from the main memory are retrieved and placed into the L1 cache memory, the L2 cache memory or the TLB. In one example, the TLB is a buffer which includes an address translation table which maps a virtual address to a physical address.

In one example, the example processor/memory architecture 200 includes a bus interface subsystem 271 with a plurality of interface lines including a first interface line 261, a second interface line 262, a third interface line 263, a fourth interface line 264 and a fifth interface line 265.

In one example, the first interface line 261 connects the first processing engine 211 to the bus interface subsystem 271. In one example, the second interface line 262 connects the second processing engine 212 to the bus interface subsystem 271. In one example, the third interface line 263 connects the third processing engine 213 to the bus interface subsystem 271. In one example, the fourth interface line 264 connects the fourth processing engine 214 to the bus interface subsystem 271. In one example, the fifth interface line 265 connects the fifth processing engine 215 to the bus interface subsystem 271.

In one example, the example processor/memory architecture 200 includes an asynchronous bridge 272 to provide an interface between elements with different clock references (i.e., asynchronous elements).

In one example, the example processor/memory architecture 200 includes a snoop filter 273. In one example, the snoop filter 273 controls monitoring of cache coherency among a plurality of processors.

In one example, the example processor/memory architecture also includes a level 3 (L3) cache memory 274. In one example, the L3 cache memory 274 has a longer memory access time (i.e., greater latency) and a larger memory capacity than the L2 cache memory. In one example, the L1 cache memory, the L2 cache memory and the L3 cache memory 274 are part of a memory hierarchy.

In one example, the L3 cache memory 274 is connected to a main memory 280 (e.g., a double data rate (DDR) memory) via a first memory interface 281, a second memory interface 282, a third memory interface 283, a fourth memory interface 284 and a fifth memory interface 285.

In one example, the main memory 280 is connected to a memory management unit (MMU) 275 and a plurality of L2 cache memories and a plurality of L1 cache memories via a memory databus 286. In one example, the MMU is configured to manage and/or control a memory (e.g., the main memory, the cache memories).

In one example, the operating system 290 assigns clock frequencies using a clock distribution from a required frequency output port $f_{req}$ 296 by delivering a plurality of clock frequencies. In one example, the plurality of clock frequencies includes a first core frequency $f_{core1}$ 291 for the first processing engine 211, a second core frequency $f_{core2}$ 292 for the second processing engine 212, a third core frequency $f_{core3}$ 293 for the third processing engine 213, a fourth core frequency $f_{core4}$ 294 for the fourth processing engine 214 and a fifth core frequency $f_{core5}$ 295 for the fifth processing engine 215. In one example, the plurality of clock frequencies includes a bus frequency $f_{bus}$ 297 for the bus interface 271, an L3 frequency $f_{L3}$ 298 for the L3 cache memory 274 and a main memory frequency $f_{DDR}$ 299 for the main memory 280.

In one example, prefetching may be useful only if prefetch requests are sent early such that memory latency is sufficiently masked. In one example, if a processor is operating at a lower clock frequency than a reference clock frequency, utility of cache prefetching may be diminished relative to a processor operating at a higher clock frequency. In one example, prefetch efficiency may be lower if a last level cache memory operates at a lower clock frequency that the reference clock frequency since cache requests may not be sent early enough to mask memory latency. In one example, a low efficiency cache prefetching scheme may incur both a performance penalty and a dc power penalty.

In one example, an information processing system with a plurality of processing engines may include a plurality of prefetchers at different cache memory levels (e.g., L1 cache, L2 cache, L3 cache, etc.). For example, a control register in one processing engine may be set to allow disabling of one or more prefetchers of the plurality of prefetchers. In one example, the disabling of one or more prefetchers of the plurality of prefetchers may controlled based on a dynamic approach of prefetching disabling. In one example, the dynamic approach of prefetcher disabling is a clock frequency comparison. In one example, if the clock frequency is less than a settable threshold frequency, then one or more prefetchers of the plurality of prefetchers may be disabled. In one example, if the clock frequency is equal to or greater than the settable threshold frequency, then one or more prefetchers of the plurality of prefetchers may be enabled. That is, one or more prefetchers may be disabled if the clock frequency is low, relative to the settable threshold frequency.

Figure 3:
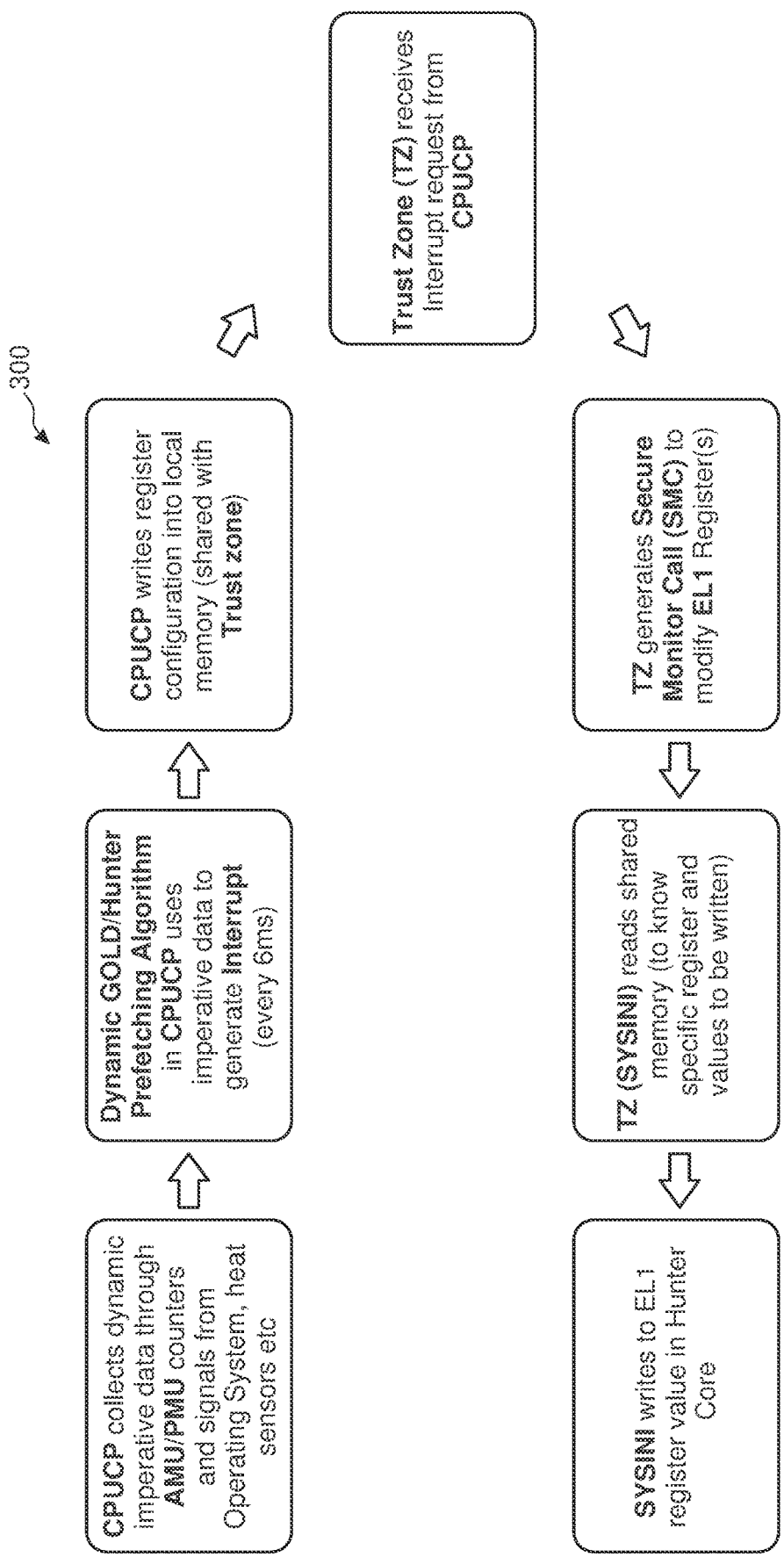
FIG. 3 illustrates an example of a dynamic prefetch process flow.

In one example, the dynamic approach of prefetcher disabling may maintain processing engine performance while reducing dc power consumption compared to a static approach of prefetcher disabling. In one example, the static approach of prefetcher disabling relies on an a priori configuration for scheduling prefetchers. In one example, the static approach may have a significant processing engine performance degradation compared to the dynamic approach. FIG. 3 illustrates an example of a dynamic prefetch process flow 300. In one example, the example of a dynamic prefetch process flow relies on dynamic imperative data to update contents of a control register.

FIG. 4 illustrates an example of a dynamic prefetching flow diagram 400. In block 410, collect a dynamic imperative data from a plurality of monitoring counters and a plurality of environmental sensors. In one example, a dynamic imperative data is collected from a plurality of monitoring counters and a plurality of environmental sensors. In one example, the plurality of monitoring counters may include activity monitoring counters for overall system management and control. In one example, the plurality of environmental sensors may include operating system status messages, thermal sensors, voltage sensors, etc. In one example, dynamic imperative data may include data which may be changing (i.e., dynamic) and which may be explicitly defined (i.e., imperative). In one example, the collecting is performed by a control program of a processor. In one example, the dynamic imperative data may be a processor clock frequency.

In block 420, generate a processor interrupt at a periodic update rate using the dynamic imperative data. In one example, a processor interrupt is generated at a periodic update rate using the dynamic imperative data. In one example, the plurality of monitoring counters may determine the periodic update rate. In one example, the processor interrupt is a priority signal sent to the processor to indicate a demand for immediate servicing. In one example, the periodic update rate is every 6 ms (i.e., at a rate of 166.7 Hz). In one example, the generating is performed by the control program of the processor. In one example, the periodic update rate is a recurring frequency at which a processor interrupt is generated.

In block 430, write a control register configuration into a local memory upon receipt of the processor interrupt. In one example, a control register configuration is written into a local memory upon receipt of the processor interrupt. In one example, the local memory is shared with a trust zone element. In one example, the control register configuration is a plurality of parameters for the operation of a control register. In one example, the control register configuration may include a settable threshold frequency. In one example, the trust zone element may include a register with the highest privilege level of all registers within the processor. In one example, the trust zone element is a subsystem, a portion or a part of a processor wherein the trust zone element has higher integrity and higher security than other subsystem, portion or part of the processor. In one example, the control register is a register which manages the operation of the processor. In one example, the writing is performed by the control program of the processor.

In block 440, receive an interrupt request based on the processor interrupt from a control program of a processor. In one example, an interrupt request based on the processor interrupt is received from a control program of a processor. In one example, the receiving is performed by the trust zone element. In on example, the control program of the processor is a management software for the processor operation. That is, the control program is a software used for managing the operation of the processor. In one example, the control program is a supervisor, task manager, hypervisor, etc. of the processor.

In block 450, modify an exception level register to generate a secure monitor call (SMC) when triggered by receipt of the interrupt request. In one example, an exception level register is modified to generate a secure monitor call (SMC) when triggered by receipt of the interrupt request. In one example, the modification is performed by the trust zone element. In one example, the exception level register is a register with the highest privilege level of all registers within the processor. In one example, the SMC is a directive to gather information and data in a secure manner.

In block 460, read a shared memory to determine a specific control register and one or more prefetch values based on the SMC. In one example, a shared memory is read to determine a specific control register and one or more prefetch values based on the SMC. In one example, the one or more prefetch values may determine enablement or disablement of a cache prefetch. In one example, if the clock frequency is greater than the settable threshold frequency, then enable the cache prefetch. In one example, if the clock frequency is less than or equal to the settable threshold frequency, then disable the cache prefetch. In one example, the read is performed by the trusted zone element. In one example, the system initialization module is a subsystem of the trusted zone element. In another example, the system initialization module is the trusted zone element. In yet another example, the system initialization module is a subsystem, a portion or a part of a processor, wherein the system initialization module has a lower integrity and a lower security than the trust zone element of the processor.

In block 470, write the one or more prefetch values to the exception level register. In one example, the one or more prefetch values is written to the exception level register. In one example, the write is performed by the system initialization module. In one example, the one or more prefetch values are used to enable or disable the cache prefetch. In one example, the cache prefetch is executed on an L1 cache memory, an L2 cache memory, an L3 cache memory, or a memory management unit (MMU).

In one aspect, one or more of the steps for providing dynamic prefetching in FIGS. 3 & 4 may be executed by one or more processors which may include hardware, software, firmware, etc. The one or more processors, for example, may be used to execute software or firmware needed to perform the steps in the flow diagrams of FIGS. 3 & 4. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:
a main memory configured to store data;
a memory hierarchy coupled to the main memory, the memory hierarchy configured to augment the main memory;
a trusted zone element coupled to the memory hierarchy, the trusted zone element configured to read a shared memory to determine a content of a specific control register and one or more prefetch values based on a secure monitor call (SMC);
a control register coupled to the memory hierarchy, the control register configured to enable or disable dynamically one or more prefetchers based on a clock frequency comparison, wherein the one or more prefetch values determine an enablement or a disablement of which of the one or more prefetchers, and wherein the one or more prefetch values determines an enablement or a disablement of a cache prefetch;
an exception level register coupled to the memory hierarchy, the exception level register configured to hold the one or more prefetch values;
a system initialization module coupled to the memory hierarchy, the system initialization module configured to write the one or more prefetch values to the exception level register; and
a control program coupled to the memory hierarchy, the control program configured to collect a dynamic imperative data from a plurality of monitoring counters and a plurality of environmental sensors.

2. The apparatus of claim 1, wherein the enablement or the disablement is based on a comparison of a clock frequency of a processor and a settable threshold frequency.

3. The apparatus of claim 1, wherein the control program is further configured to generate a processor interrupt at a periodic update rate using the dynamic imperative data.

4. The apparatus of claim 3, wherein the control program is further configured to write a control register configuration into a local memory upon receipt of the processor interrupt.

5. The apparatus of claim 4, wherein the trusted zone element is further configured to receive an interrupt request based on the processor interrupt from the control program.

6. The apparatus of claim 5, wherein the trusted zone element is further configured to modify the exception level register to generate the secure monitor call (SMC) when triggered by receipt of the interrupt request.

7. The apparatus of claim 1 wherein the memory hierarchy includes a level 1 (L1) cache memory, a level 2 (L2) cache memory and a level 3 (L3) cache memory.

8. A method comprising:
reading a shared memory to determine a content of a specific control register and one or more prefetch values based on a secure monitor call (SMC);
dynamically enabling one or more prefetchers based on a clock frequency comparison;
determining an enablement or a disablement of which of the one or more prefetchers based on the one or more prefetch values, wherein the one or more prefetch values determines an enablement or a disablement of a cache prefetch;
writing the one or more prefetch values to an exception level register;
modifying the exception level register to generate the secure monitor call (SMC) when triggered by receipt of an interrupt request;
receiving the interrupt request based on a processor interrupt from a control program of a processor; and
generating the processor interrupt at a periodic update rate using a dynamic imperative data; and
collecting the dynamic imperative data from a plurality of monitoring counters and a plurality of environmental sensors.

9. The method of claim 8, further comprising enabling the cache prefetch if a clock frequency of a processor is greater than a settable threshold frequency, or disabling the cache prefetch if the clock frequency of the processor is less than or equal to a settable threshold frequency; and executing the cache prefetch on a cache memory or on a memory management unit (MMU).

10. The method of claim 9, wherein the cache memory is one of: an L1 cache memory, an L2 cache memory, or an L3 cache memory.

11. The method of claim 8, further comprising writing a control register configuration into a local memory upon receipt of the processor interrupt, wherein the control register configuration includes a settable threshold frequency.

12. A non-transitory computer-readable medium storing computer executable code, operable on a device comprising at least one processor and at least one memory coupled to the at least one processor, wherein the at least one processor is configured to implement dynamic memory prefetching, the computer executable code comprising:
instructions for causing a computer to read a shared memory to determine a content of a specific control register and one or more prefetch values based on a secure monitor call (SMC);
instructions for causing the computer to write the one or more prefetch values to an exception level register;
instructions for causing the computer to enable a cache prefetch if a clock frequency of a processor is greater than a settable threshold frequency;
instructions for causing the computer to disable the cache prefetch if the clock frequency of the processor is less than or equal to the settable threshold frequency and, wherein the one or more prefetch values determines an enablement or a disablement of the cache prefetch;
instructions for causing the computer to modify the exception level register to generate the secure monitor call (SMC) when triggered by receipt of an interrupt request;
instructions for causing the computer to receive the interrupt request based on a processor interrupt from a control program of a processor;
instructions for causing the computer to write a control register configuration into a local memory upon receipt of the processor interrupt;
instructions for causing the computer to generate the processor interrupt at a periodic update rate using a dynamic imperative data; and instructions for causing the computer to collect the dynamic imperative data from a plurality of monitoring counters and a plurality of environmental sensors.

* * * * *